US006421133B2

(12) United States Patent
Kasai et al.

(10) Patent No.: US 6,421,133 B2
(45) Date of Patent: Jul. 16, 2002

(54) HYBRID PRINTER, PRINTER MOUNTING BASE AND PRINTER THAT IS MOUNTABLE ON PRINTER MOUNTING BASE

(75) Inventors: Kazuaki Kasai; Toshiya Matsuse; Tadashi Inakoshi, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,539

(22) Filed: Jun. 2, 1997

(51) Int. Cl.$^{7}$ ................................................ G06K 15/00

(52) U.S. Cl. ....................................... 358/1.13; 358/1.1

(58) Field of Search ................................ 395/112, 114, 395/113, 115; 358/1.1–1.9, 1.11–1.18; 347/108, 106, 152, 222, 197, 242, 245, 257, 263, 170; 355/75, 76; 400/691, 692, 693; 399/361, 381

(56) References Cited

U.S. PATENT DOCUMENTS 3,688,691 A * 9/1972 De Vol et al. ................ 400/82
4,386,265 A 5/1983 Sugimori ........................ 235/3
4,493,038 A * 1/1985 Bovio et al. .................... 235/2
4,589,069 A * 5/1986 Endo et al. ................. 235/381
4,768,435 A * 9/1988 Nimura et al. ................ 400/79
4,867,257 A * 9/1989 Kuchler ....................... 235/383
4,960,338 A * 10/1990 Sheldon ................... 400/636.1
5,061,100 A * 10/1991 Brouwer et al. ............ 400/642
5,067,832 A 11/1991 Baur et al. ..................... 400/66
5,278,396 A * 1/1994 McGaha ..................... 235/375

FOREIGN PATENT DOCUMENTS

EP 0654767 5/1995
JP 4148953 5/1992

* cited by examiner

*Primary Examiner*—Dov Popovici
*Assistant Examiner*—King Y. Poon
(74) *Attorney, Agent, or Firm*—Hogan & Hartson, L.L.P.

(57) ABSTRACT

A hybrid printer includes a first printer, a second printer and a printer mounting base capable of mounting the first and second printers. The first printer has a first printing section for printing on a first recording paper, a first transfer path for transferring the first recording paper to the first printing section, a first base having the first transfer path formed thereon, and a first cantilever for supporting the first printing section above the first base. The second printer has a second printing section for printing on a second recording paper. The printer mounting base has a second base, a second transfer path formed on the second base and a second cantilever fixed to the second base. The second printer is mountable on the second cantilever of the printer mounting base. The printer mounting base is mountable in the rear of the first printer, and the second transfer path is disposed on an extension line of the first transfer path and continuous to the first transfer path when the printer mounting base is mounted on the first printer.

22 Claims, 14 Drawing Sheets

HYBRID PRINTER, PRINTER MOUNTING BASE AND PRINTER THAT IS MOUNTABLE ON PRINTER MOUNTING BASE

BACKGROUND OF THE INVENTION

1. Field of the Invention

The present invention relates to a hybrid printer used in, for example, a POS (point-of-sales) system, and more particularly to a hybrid printer that is capable of printing on sheets of recording paper in various forms, such as, cut sheets of slip paper, rolled paper, thermal paper and the like.

2. Description of Related Art

A slip printer for printing on slips of paper, such as bills and the like, has been widely known. Since copies of an original paper may be required in printing by the slip printer, a serial printer that has a dot-impact type printing head is widely used as the slip printer.

Since there are a variety of slips of paper of different sizes, the slip printer, in many cases, has a paper transfer path which is opened at one end side thereof to accept slips of paper of different sizes. In other words, the paper transfer path has three opened sides in the paper feeding direction and at the one end side. Because of this, the slip printer often uses a structure in which a printing head and a mechanism for reciprocating the printing head are supported on a cantilever type frame.

Also, there are receipt printers for printing on sheets of receipt paper. One type of receipt printer using a thermal head for thermally printing on a rolled sheet of thermal paper is well known.

In recent years, the POS systems have become more popular. In this connection, hybrid printers incorporating at least the above-described two types of printers are on greater demand from the view point of reducing the required space in retail stores.

However, when the two printing sections are mounted in a common housing of the hybrid printer, the following problems arise.

When a printer having a plurality of printing sections is manufactured, each of the printing sections requires examination and adjustment (for example, adjustment of current pulse widths, adjustment of the platen gap and the like) specific to each of the printing sections. However, the examination and adjustment after completion of the entire assembly are not favorable from the viewpoint of the work efficiency. This results in a longer manufacturing time for completing each product.

Also, in the case of a breakdown of the printer, different parts for each of the printing sections have to be replaced, and independent repair work is required for each of the printing sections. As a consequence, it takes a longer time for the maintenance work.

Furthermore, the printer sections (e.g., a first printer section and a second printer section), that can be used in a hybrid printer, may be combined together and used in a hybrid printer, or may be used in an independent printer. In other words, there are cases of manufacturing a hybrid printer having the first and second printer sections, a printer having only the first printer section, and a printer having only the second printer section. For all of these printer types, a housing for covering each of the printer sections and a circuit board for controlling each of the printer sections are required. This is not favorable from the viewpoint of reducing the cost and shortening the delivery time.

From the view point of the required space reduction, a hybrid printer is preferably designed so that a receipt printing section for performing the receipt printing is disposed adjacent to a printing mechanism for a slip printing section for performing the slip printing. As a result, a cantilever for supporting the printing mechanism for the slip printing receives the weight of the receipt printing section in addition to the weight of the printing mechanism for the slip printing. Accordingly, the fixed end of the cantilever requires a substantial structural strength.

Moreover, the longer the cantilever that supports the printing mechanism, the more a difference in the platen gap (the distance between the printing head and the platen) between the fixed end and the free end of the cantilever likely occurs. When the platen gap is not accurately adjusted, the density of printed characters becomes uneven, resulting in a poor print quality. In other words, the heavier the load is applied to the cantilever, the greater the tendency of the poor print quality develops.

SUMMARY OF THE INVENTION

It is an object of the present invention to provide a low manufacturing cost hybrid printer that is easy to assemble and maintain. It is another object of the present invention to provide a hybrid printer that requires a smaller installation area.

In accordance with one embodiment of the present invention, a hybrid printer has a first printer, a second printer and a printer mounting base capable of mounting these printers which are structured in a manner described below. Also, the printers used in a hybrid printer in accordance with the embodiment of the present invention and the printer mounting base for mounting the printers have the following characteristics.

The first printer has a first printing section for printing on a first recording paper, a first transfer path for transferring the first recording paper to the first printing section, a first base having the first transfer path formed thereon, and a first cantilever for supporting the first printing section above the first base. For example, a serial impact type print head is used for the printing section of the first printer, and a cut sheet of paper is used for the first recording paper.

The second printer has a second printing section for printing on a second recording paper. In an embodiment, the second recording paper is a rolled sheet of thermal paper, and a thermal printer is used for the second printing section.

The printer mounting base has a second base, a second transfer path formed on the second base and a second cantilever fixed to the second base.

The second printer is mountable on the second cantilever of the printer mounting base. The printer mounting base is mountable in the rear of the first printer, and the second transfer path is disposed on an extension line of the first transfer path and continuous to the first transfer path.

In this manner, the second printer is mounted on the second cantilever provided on the printer mounting base, which is different from the first cantilever having the first printing section. As a result, an excessive weight is not applied to the first cantilever. In other words, the weight of the first printing section is received by the first cantilever and the weight of the second printer is received by the second cantilever. This structure therefore prevents deterioration of the accuracy of the platen gap, i.e., the distance between the first printing section and the platen provided in the first transfer path.

Also, the following manufacturing process can be implemented as a result of the above described structure. Namely, the first printer and the second printer are manufactured on independent manufacturing lines, and adjusted and examined, independently from each other. Then, the first and second printers can be mounted on a printer mounting base when assembling a hybrid printer. As a result, the work efficiency is improved. Moreover, even when one of the printers is broken, the broken printer can readily be removed from the other. Accordingly, the maintenance work becomes easier.

Also, the first printer has a fixing end section for supporting the first cantilever and a first guide section provided adjacent to the fixing end section for guiding a side edge of the first recording paper. The printer has a fixing end section for supporting the second cantilever and a second guide section provided adjacent to the fixing end section for guiding a side edge of the first recording paper. The guide sections are disposed so that the second guide section is disposed on an extension line of the first guide section and continuous to the first guide section when the first printer is mounted on the mounting base. As a result, cut sheets are securely and correctly guided along the first guide section and the second guide section.

Moreover, the first printer includes a housing that covers the first printing section and defines an aperture, a controller circuit for controlling the first printing section and a controller circuit for controlling the second printer. The second printer includes a housing that covers the second printing section and defines an aperture, and a driving device that drives the second printer. The apertures are located opposite to each other when the first printer and the second printer are mounted on the mounting base.

When a hybrid printer is manufactured by using the first and the second printers, the control device for controlling the second printer is connected to the driving device through the apertures.

On the other hand, when the first printer, that can be combined with the second printer, is manufactured as a stand-alone printer, a housing without an aperture is prepared, or the aperture may be closed by a cover. Also, when the second printer, that can be combined with the first printer, is manufactured as a stand-alone printer, a control board that has a controller circuit for controlling only the second printer and a second housing that covers the control board are prepared. The second housing is attached to an appropriate area, for example, the under side of the second printer.

Accordingly, when three types of printers including a hybrid printer are manufactured, many components including the housing, the circuit board and the like can be commonly used. As a result, the manufacturing cost is lowered, and different kinds of printers that meet the different demands can be manufactured in a relatively short delivery time.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings.

DETAILED DESCRIPTION OF PREFERRED EMBODIMENTS

A hybrid printer in accordance with an embodiment of the present invention will be described below with reference to FIGS. 1–12.

Figure 1:
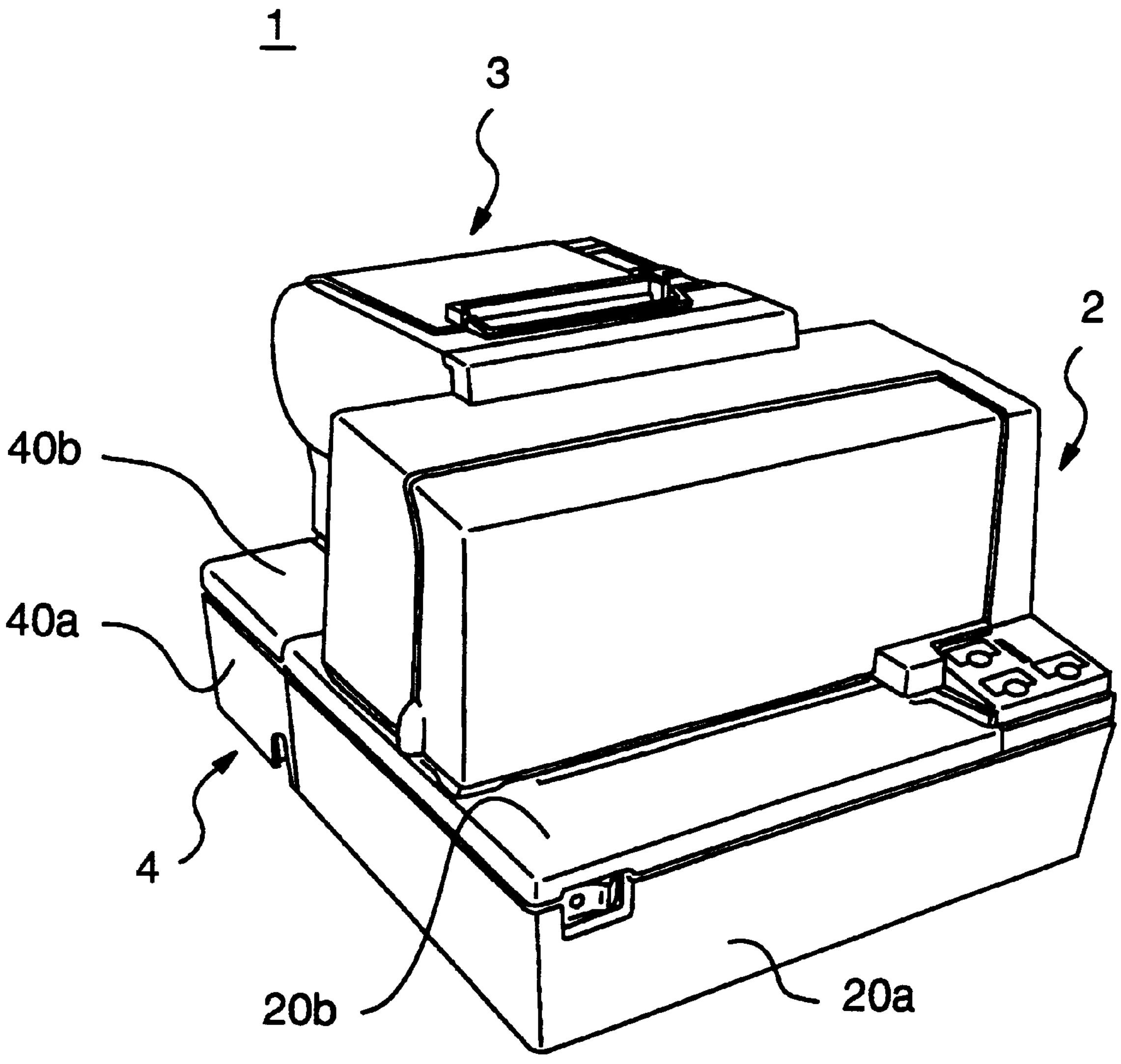
FIG. 1 shows a perspective view of the external structure of a hybrid printer in accordance with an embodiment of the present invention.
Figure 12A:
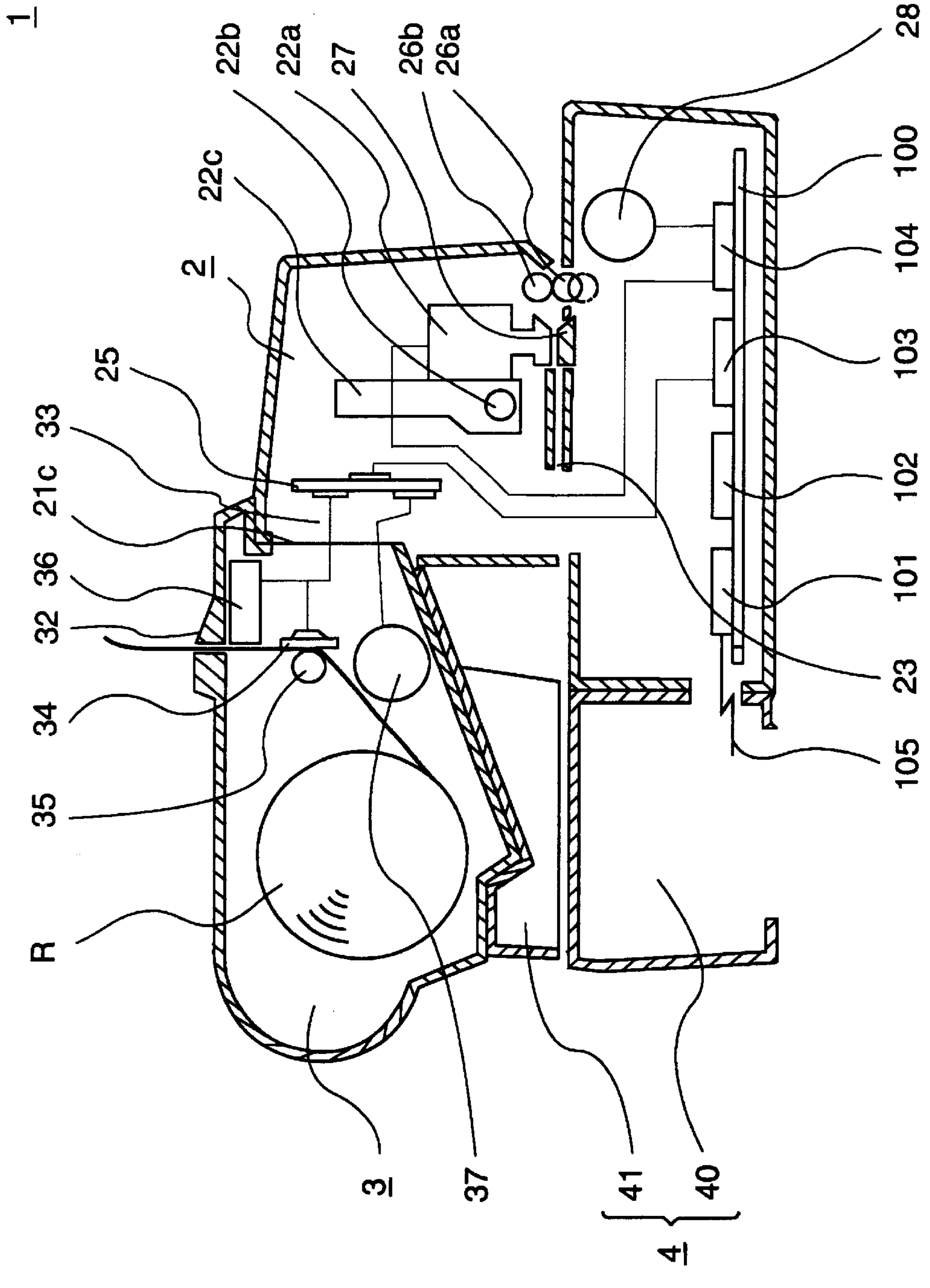
FIG. 12*a* shows a cross-sectional view of the hybrid printer shown in FIG. 1.

FIG. 1 shows a perspective view of the external structure of a hybrid printer 1. FIG. 12*a* shows a cross-sectional view of the hybrid printer 1 shown in FIG. 1.

As shown in FIG. 1, the hybrid printer 1 in accordance with the present embodiment includes an impact type first printer 2 for printing on cut sheets of paper (hereinafter referred to as a slip printer), a thermal type second printer 3 for printing on a sheet of thermal paper provided in a roll (hereinafter referred to as a receipt printer), and a mounting base 4 that is connected to the rear of the slip printer 2 and that is adapted to mount the receipt printer 3.

The slip printer 2, the receipt printer 3 and the mounting base 4 can be detachably assembled together. The slip printer 2, the receipt printer 3 and the mounting base 4 are integrally designed so that they look like a single unit when they are assembled together, as shown in FIG. 1.

Figure 2:
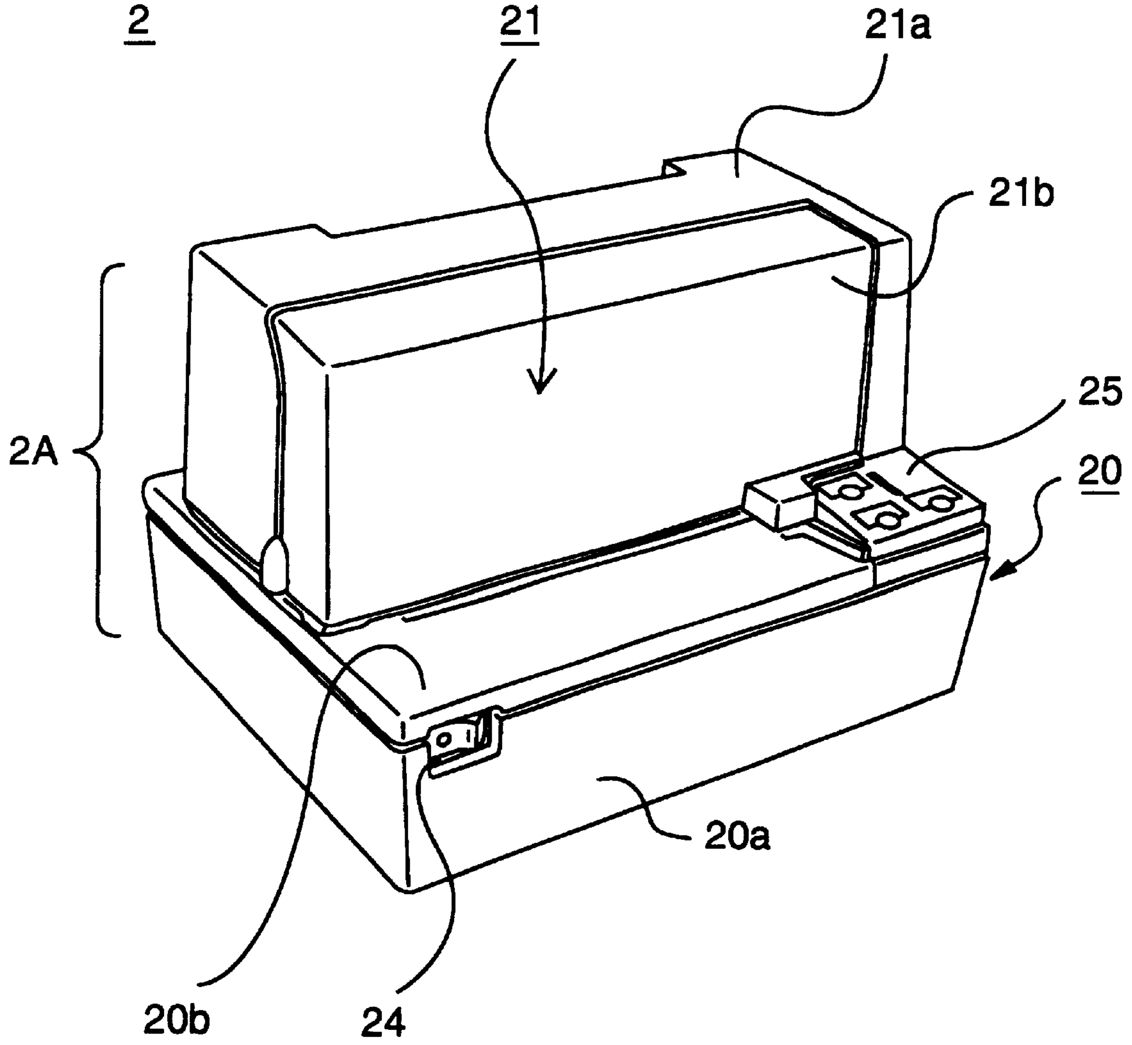
FIG. 2 shows a frontal perspective view of the overall structure of a slip printer in accordance with an embodiment of the present invention.
Figure 3:
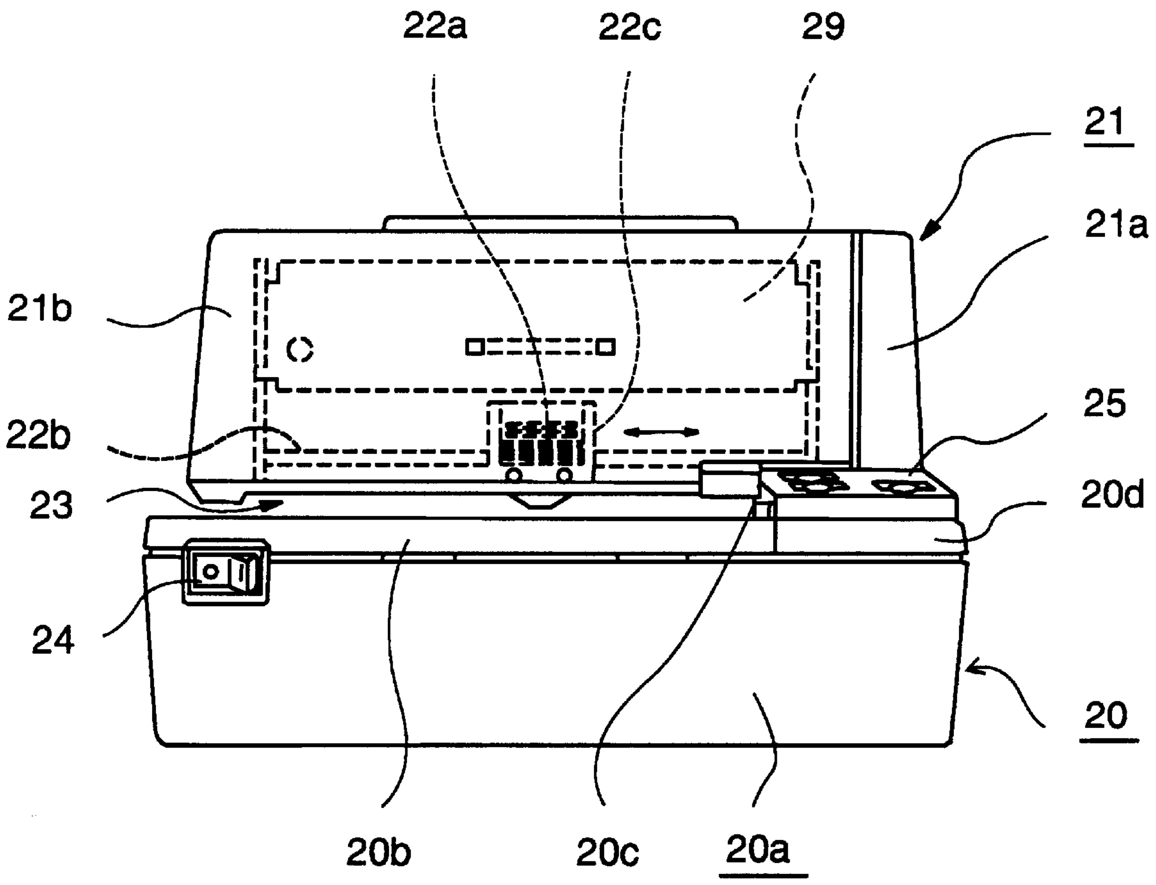
FIG. 3 shows a front view of the overall structure of the slip printer shown in FIG. 2.
Figure 4:
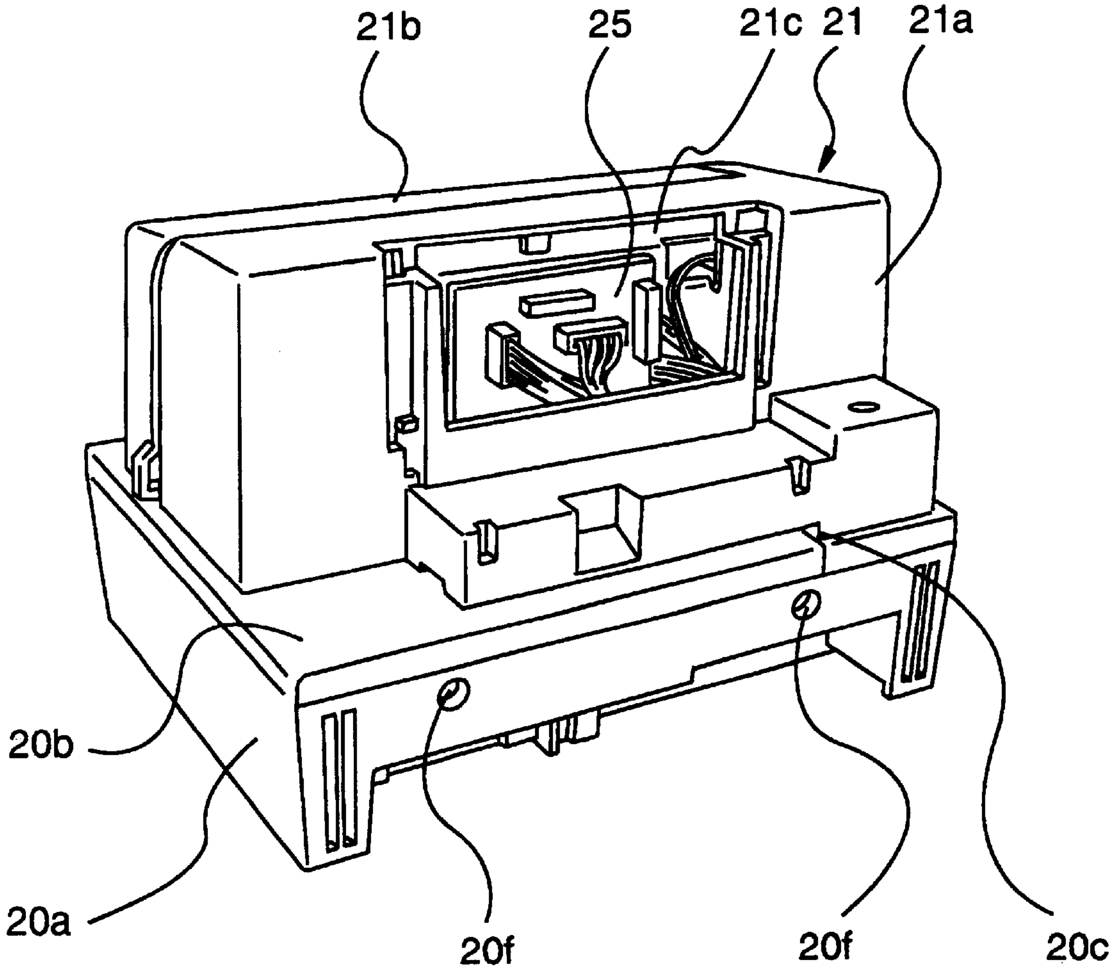
FIG. 4 shows a rear perspective view of the overall structure of the slip printer shown in FIG. 2.

FIGS. 2–4 show the overall structure of the slip printer 2. In particular, FIG. 2 shows a frontal perspective view, FIG. 3 shows a front view, and FIG. 4 shows a rear perspective view of the slip printer 2.

As shown in FIG. 2, the slip printer 2 is mainly formed from a base 20 (first base) and a printing section 21 that is supported by a cantilever mounted on the base 20. As shown in FIG. 12*a*, the base section 20 is mainly formed from a document table 20*b* that guides the insertion of a slip of paper to the printing section 21, a paper feed drive roller 26*a* for conveying a slip of paper, a platen 27, a lower case 20*a* and a circuit board 100 that is mounted inside the lower case 20*a*.

An operation panel 25 having control switches is provided adjacent to the document table 20*b* in a corner section of the lower case 20*a*. A power switch 24 is mounted in one corner section of the front surface of the lower case 20*a*. A housing 2A of the slip printer 2 is composed of the case 20*a*, an upper case 21 a and a front cover 21*b*, and is made of resin, such as, for example, ABS resin and the like.

The printing section 21 is covered by the upper case 21*a* and the front cover 21*b* that is provided in the front side of the upper case 21*a*. As shown in FIG. 3, a guide shaft 22*b*, a carriage 22*c* that is reciprocal along the guide shaft 22*b*, and a serial dot impact type printing head 22*a* mounted on the carriage 22*c* are provided inside the cases 21*a* and 21*b*. The printing head 22*a* uses an ink ribbon (not shown) to print on a slip of paper that is inserted and transferred to an area in front of the printing head 22*a*.

The guide shaft 22*b* that supports and guides the printing head 22*a* is supported by a cantilever frame 29 that has a fixed end on the side of the operation panel 25. The frame 29 is fixed to a mounting section 20*d* of the base 20.

As shown in FIG. 12*a*, a platen 27 is located at a position opposite to the printing head 22*a* of the base 20. A paper feed drive roller 26*a* is provided in front of the platen 27 for transferring a slip of paper that is inserted. The case 21*b* has a follower roller 26*b* that is brought in contact with the drive roller 26*a* when the case 21*b* is closed. When a slip of paper is inserted from the front side of the document table 20*b*, the slip of paper is pinched by the drive roller 26*a* and follower roller 26*b*. The slip of paper is advanced by the rotation of the drive roller 26*a* through a first paper transfer path 23 defined between the document table 20*b* and the printing section 21. The drive roller 26*a* can be protruded and retracted with respect to the paper transfer path 23. The drive roller 26*a* is retracted to a position shown in a phantom line of FIG. 12*a* when a slip of paper is initially inserted. When a slip of paper is further inserted, the drive roller 26*a* and the follower roller 26*b* are brought into contact and pinch the slip of paper.

As shown in FIG. 3, a first guide section 20*c* for guiding one end of the inserted slip of paper is provided adjacent to the fixed end portion of the cantilever that supports the printing section 21. Therefore, the paper transfer path 23 of the slip printer 2 is opened except the guide section 20*c* provided adjacent to the fixed end side of the cantilever. In other words, the paper transfer path 23 has three open sides in the paper transfer direction and the paper width direction.

As shown in FIG. 4 and FIG. 12*a*, the rear section of the upper case 21*a* defines an opening 21*c*. A relay board 25 is provided in the rear of the printing head 22*a* within the printing section 21. The relay board 25 connects signal lines 33 that are used to drive a thermal head 34 and a step motor 37 for driving a platen roller 35 provided within the receipt printer 3 to the control circuit 100 provided within the slip printer 2.

Figure 5:
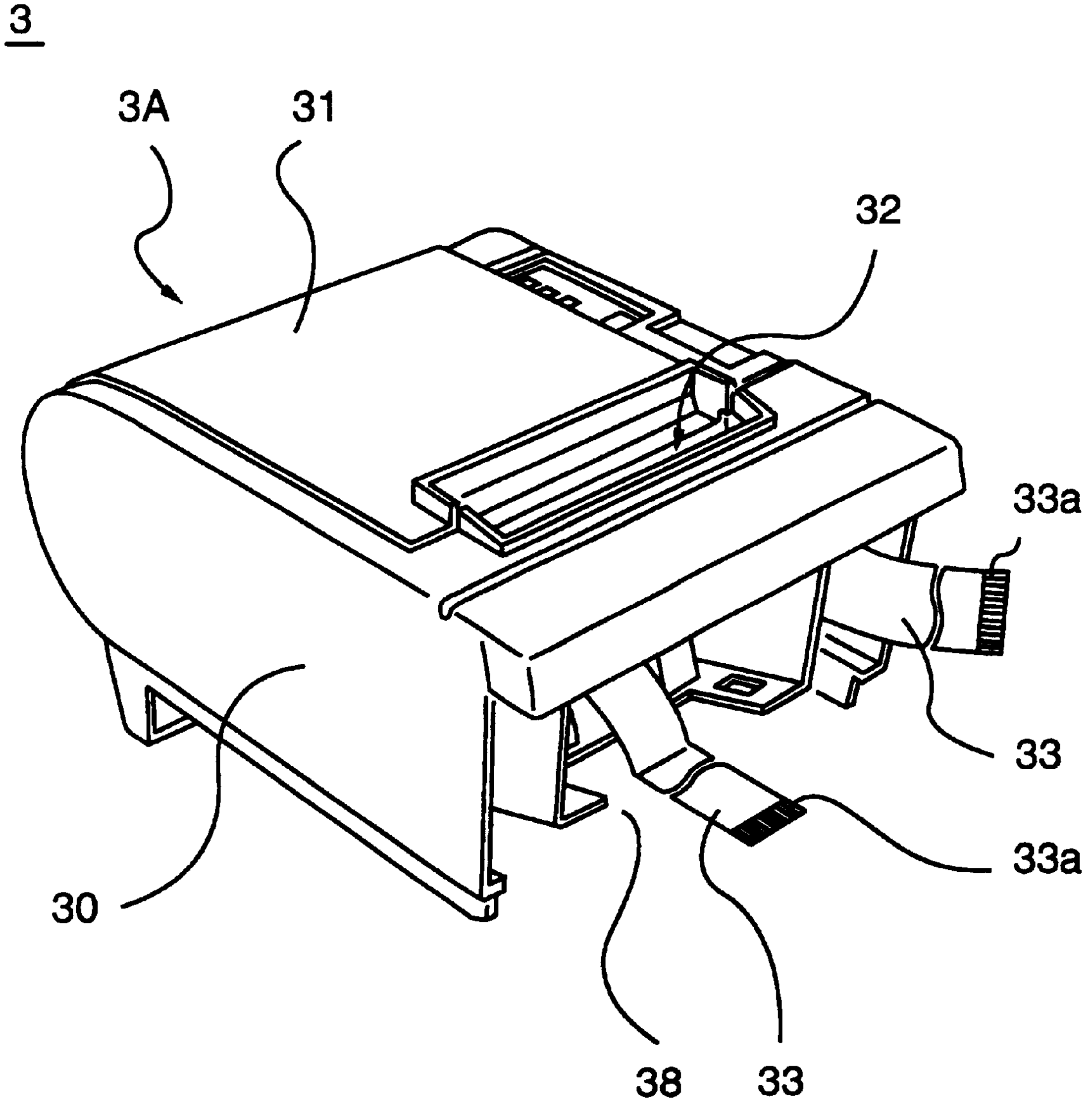
FIG. 5 shows a perspective view of the external structure of a receipt printer in accordance with an embodiment of the present invention.

FIG. 5 shows a perspective view of the exterior structure of the receipt printer 3, which is a second printer in accordance with the embodiment of the present invention.

The receipt printer 3 is a printer apparatus for printing receipts that is used, for example, in the POS system.

As shown in FIG. 12*a*, the receipt printer 3 prints on a sheet of thermal paper provided in a roll R by using the thermal head 34 to issue receipts.

In addition to the thermal head 34, the receipt printer 3 has a rolled paper storage section for storing the rolled paper R, the platen roller 35 for transferring the rolled paper which is formed from a cylindrical rubber in accordance with an embodiment, the step motor 37 for rotating the platen roller, a pressure mechanism that presses the thermal head 34 to the platen roller 35, and an auto-cutter 36 that is used for cutting printed receipts.

The above-described parts are mounted within a housing 3A. The housing 3A is made of resin, such as, for example, ABS resin, and composed of an upper case 30 that covers the side sections of the receipt printer 3 and a cover 31 that covers the upper section of the receipt printer 3. After a receipt is printed, the printed receipt is cut by the auto-cutter 36 and discharged through a discharge opening 32.

As shown in FIG. 5, the upper case 30 defines in its front section an opening 38 that exposes connection terminals 33*a* of FFCs 33 that are connected to the thermal head 34, the motor 37, and a motor (not shown) that drives the auto-cutter 36. The connection terminals 33*a* are connected to connectors provided on the relay board 25 shown in FIG. 4, when the receipt printer 3 is mounted on the printer mounting base 4 and is connected to the slip printer 1.

By the structure described above, the lead wires are smoothly routed and the efficiency in device assembly is improved. In the hybrid printer of the present invention, after connecting the lead wires that are exposed through the openings 21*c* and 38, the opposing openings 21*c* and 38 are disposed adjacent to each other. As a result, the lead wires cannot be seen from outside, and the assembled printers externally look like a single printer.

Figure 6:
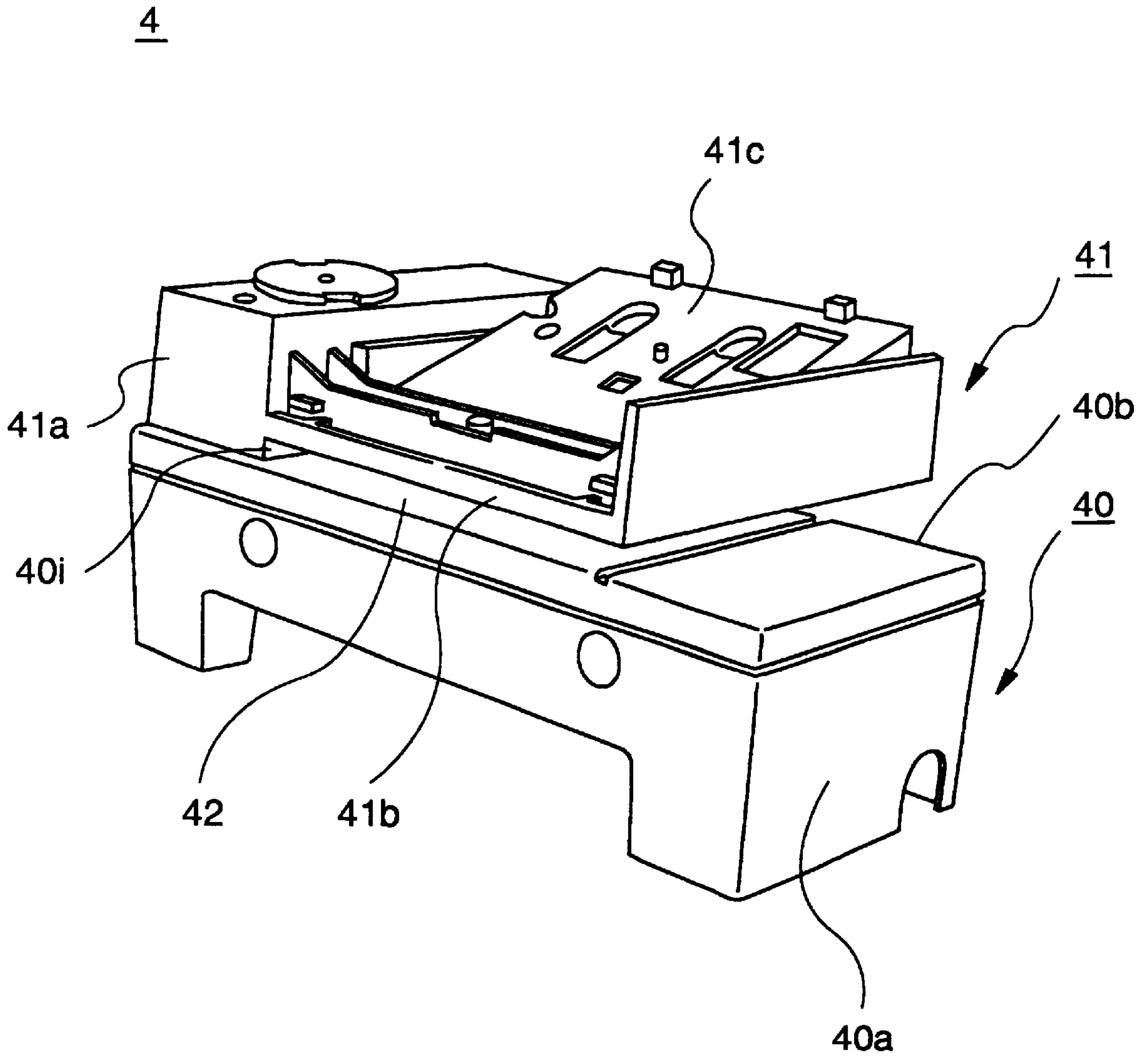
FIG. 6 shows a frontal perspective view of the external structure of a mounting base in accordance with an embodiment of the present invention.
Figure 7:
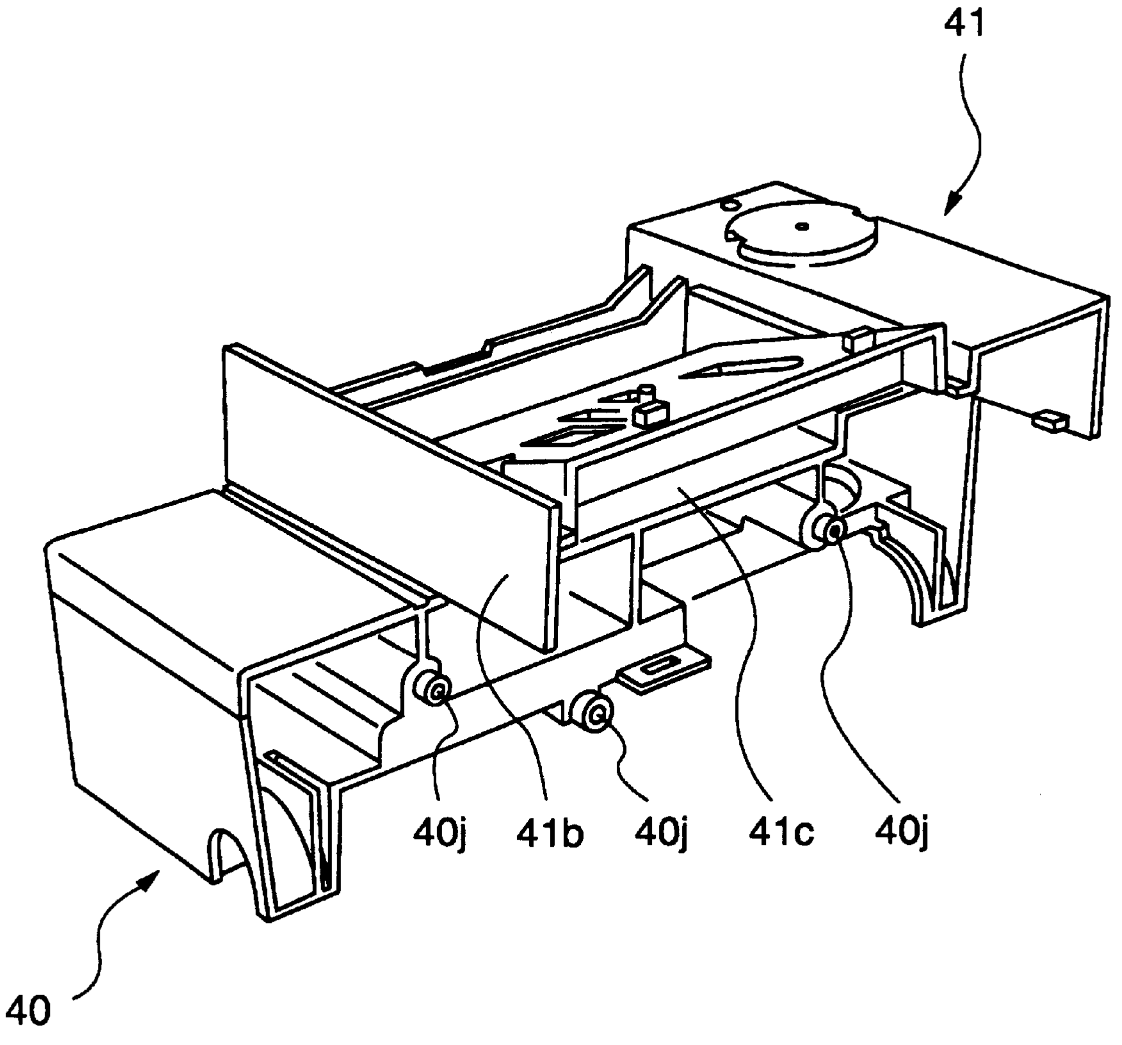
FIG. 7 shows a rear perspective view of the external structure of the mounting base shown in FIG. 6.

FIGS. 6 and 7 show the external structure of the mounting base 4. FIG. 6 shows a rear perspective view of the mounting base 4, and FIG. 7 shows a frontal perspective view of the mounting base 4.

Figure 8:
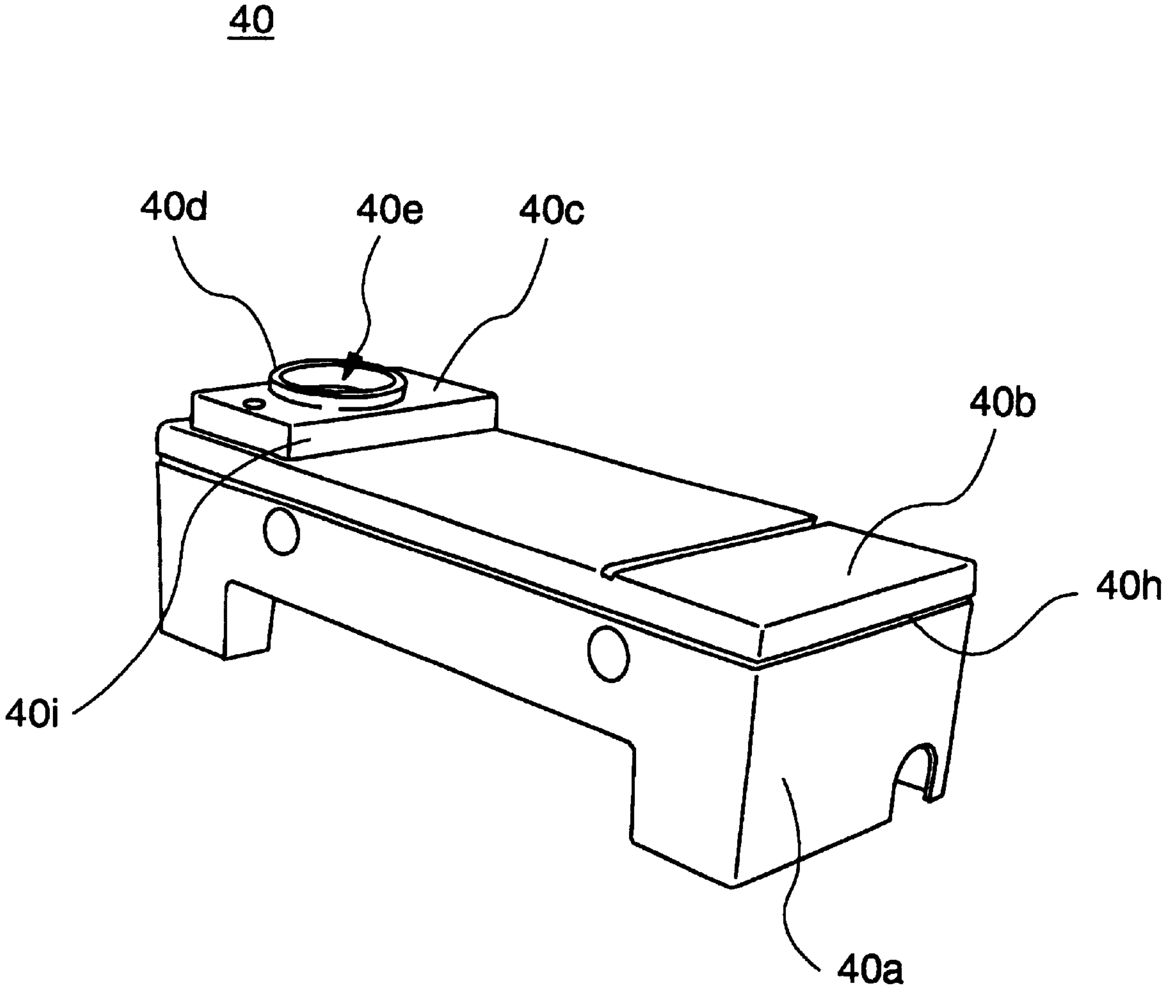
FIG. 8 shows a perspective view of the external structure of a base section of the mounting base in accordance with an embodiment of the present invention.
Figure 9:
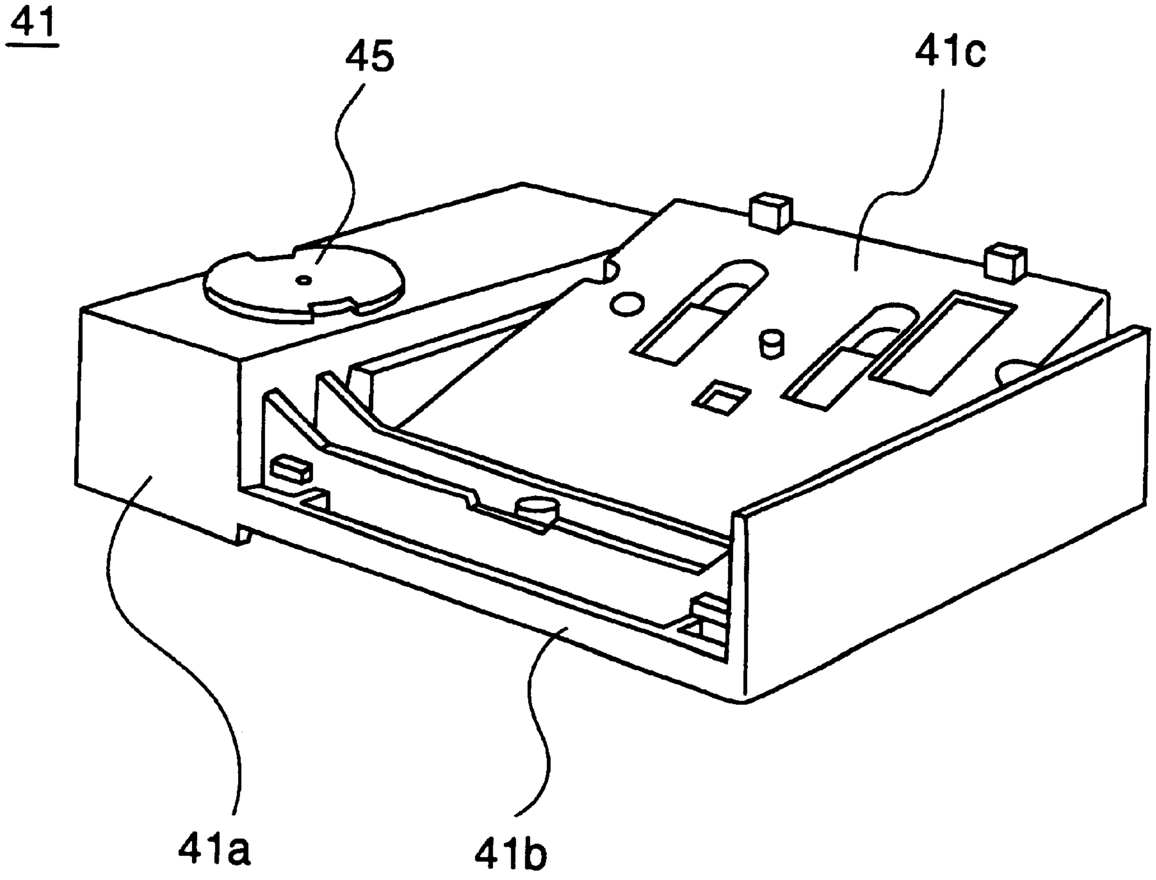
FIG. 9 shows a perspective view of the external structure of a cantilever section of the mounting base in accordance with an embodiment of the present invention.

As shown in FIGS. 6 and 7, the mounting base 4 is formed from a mounting base section 40 and a cantilever section 41 that is fixed to and supported on the mounting base section 40. The receipt printer 3 is mounted on the cantilever section 41. The mounting base section 40 and the cantilever section 41 are made of resin, such as, for example, ABS resin or the like. After the mounting base section 40 and the cantilever section 41 are formed, these sections are assembled in a manner which will be described below. It is noted that FIG. 8 shows a perspective view of the mounting base section 40, and FIG. 9 shows a perspective view of the cantilever section 41.

As shown in FIG. 7, a plurality of cylindrical protruded sections 40*j*, each defining an aperture, are formed on the mounting base section 40. The lower case 20 of the slip printer 2 has recessed sections 20*f*, as shown in FIG. 4. Each of the recessed sections 20*f* defines an aperture having a relatively small diameter. The recessed sections 20*f* of the lower case 20 are coupled with the protruded sections 40*j* of the mounting base 4 to connect the slip printer 3 to the mounting base 4. Then, tapping screws are screwed from the rear side of the mounting base section 40 through the apertures of the protruded sections 40*j* to fix the mounting base section 40 to the lower case 20.

In this manner, the fixed end section of the cantilever section 41 and the fixed end section of the slip printer 1 are aligned with each other, and the mounting base 4 is fixed to the rear side of the slip printer 2.

As a result, a second transfer path 42 defined between the cantilever section 41 and the mounting base section 40 is connected to the first transfer path 23 of the slip printer 2 so that a continuous flat transfer path is formed. In other words, as shown in FIG. 1, the surface of a mounting base document table 40_b_ and the surface of the document table 20_b_ are leveled with each other, and a guide section 40_i_ of the mounting base 40 is disposed on an extension line of the guide section 20_c_ and becomes continuous to the guide section 20_c_ of the slip printer.

As shown in FIG. 8, the mounting base section 40 is integrally formed from the lower case 40_a_ and the mounting base document table 40_b_ provided on the lower case 40_a_. A groove section 40_h_ is provide between the lower case 40_a_ and the mounting base document table 40_b_. The groove section 40_h_ is provided at the same height as that of a groove section that is defined between the lower case 20_a_ and the document table 20_b_. As a result, when the slip printer 2 and the mounting base 4 are assembled together, they externally look like a single printer.

As shown in FIG. 8, a receiving base 40_c_ for fixing the cantilever section 41 is formed adjacent to one end of the document table 40_b_ of the mounting base section 40. An aperture 40_e_ extending to the bottom section of the lower case 40_a_ is defined in the upper section of the receiving base 40_c_. A circular rib 40_d_ is formed about the aperture 40_e_.

Figure 10:
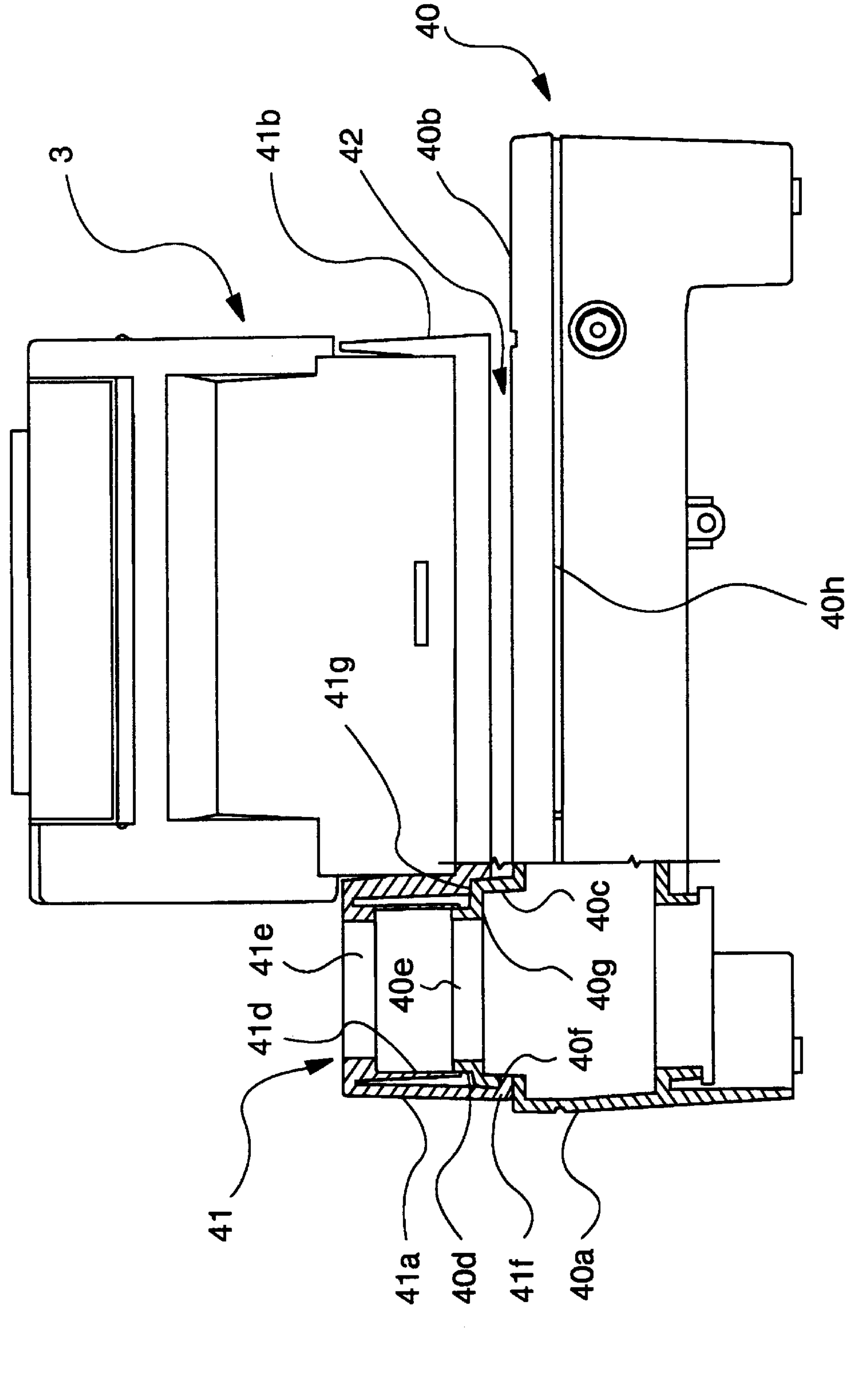
FIG. 10 shows a connection structure in which the base section and the cantilever section are connected to each other in accordance with an embodiment of the present invention.

As shown in FIG. 9, the cantilever section 41 is formed from a coupling section 41_a_ that is coupled to the receiving base 40_c_ and a beam section 41_b_. The coupling section 41_a_ and the beam section 41_b_ are integrally formed from resin, such as, ABS resin. A printer support section 41_c_ for positioning and supporting the thermal printer 3 is provided over the beam section 41_b_. An aperture 41_e_ shown in FIG. 10 is provided in the top section of the coupling section 41_a_ for receiving a column of a display apparatus. The aperture 41_e_ has substantially the same diameter of the aperture 40_e_. The aperture 41_e_ is covered by a lid 45. However, when a display apparatus is mounted, the lid 45 is removed.

A method of connecting the mounting base section 40 and the cantilever section 41 will be described below with reference to FIGS. 10 and 11.

FIG. 10 shows a plan view of the receipt printer 3 mounted on the printer mounting base 4 and also shows a cross-sectional view of the coupled section between the mounting base section 40 and the cantilever section 41.

A claw 41_f_ formed in the coupling section 41_a_ of the cantilever section 41 is inserted in an aperture 40_f_ defined in the receiving base 40_c_ so that the movement of the cantilever section 41 in the vertical direction is restricted. On the other hand, a shoulder section 40_g_ of the receiving base 40_c_ abuts an abutting section 41_g_ of the coupling section 41_a_ so that the load applied to the beam section 41_b_ is mainly received by the shoulder section 40_g_ of the receiving base 40_c_.

In this manner, the shoulder section 40_g_ receives the load applied to the beam section 41_b_, and the claw 41_f_ receives the moment force acting in the beam section 41_b_ in the direction in which the mounting base transfer path 42 is narrowed. As a result, even when a large load is applied to the beam section, bending of the beam section 41_b_ is prevented. To prevent separation of the shoulder section 40_g_ from the abutting section 41_g_, the receiving base 40_c_ and the coupling section 41_a_ are fixed to each other by screws (not shown).

Further, in accordance with the present embodiment, a cylindrical rib 41_d_ that engages the rib 40_d_ of the receiving base 40_c_ is formed inside the coupling section 41_a_. In other words, the interior wall of the cylindrical rib 41_d_ engages the exterior wall of the rib 40_d_ which is cylindrical in a preferred embodiment. By the engagement of the ribs 40_d_ and 41_d_, the mounting base section 40 and the cantilever section 41 are more strongly connected to each other.

Figure 11:
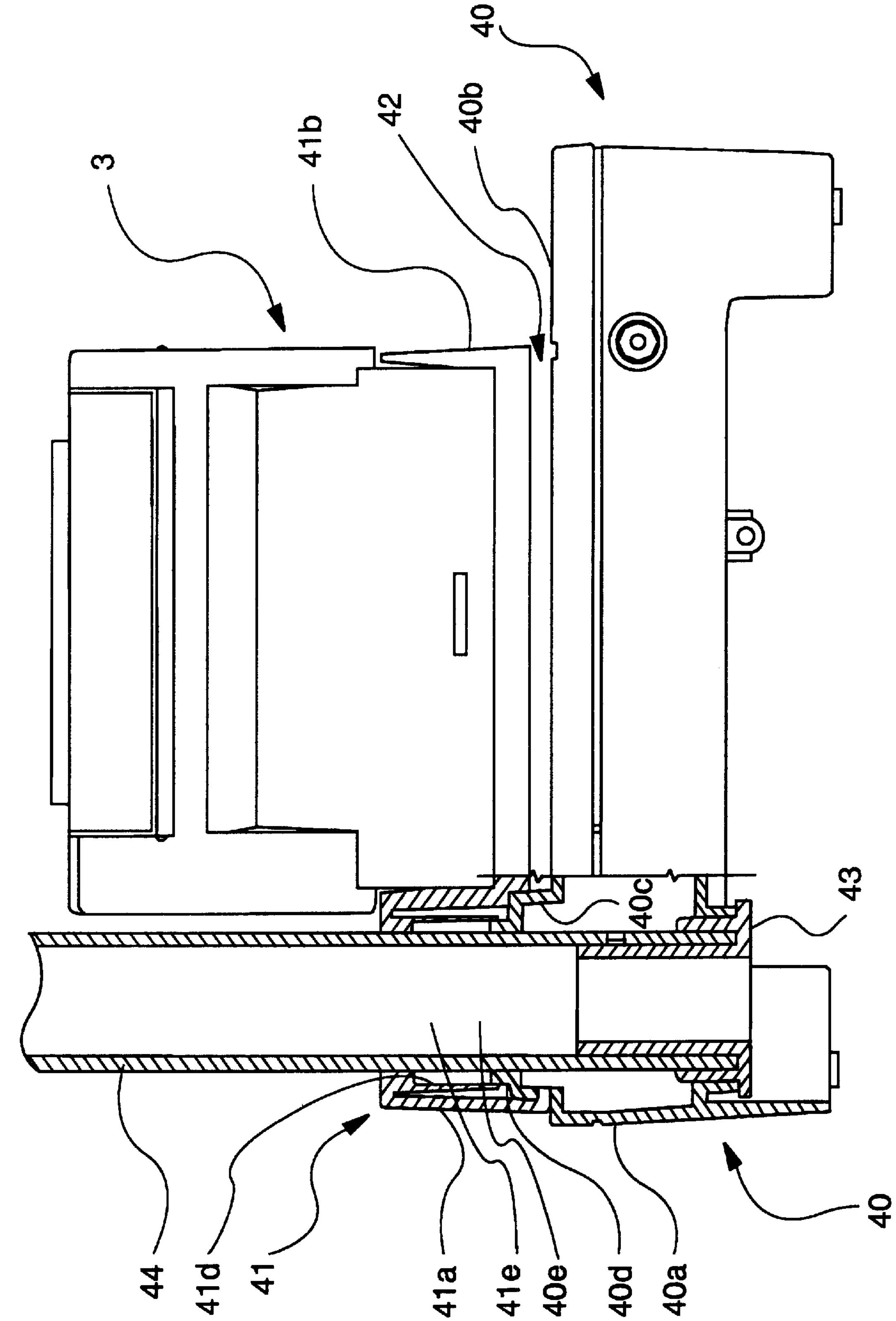
FIG. 11 shows a connection structure in which the base section and the cantilever section are connected to each other shown in FIG. 10 with a column of a display apparatus being inserted in the connection structure and supported by a column support member.

Moreover, as shown in FIG. 11, a column support member 43 is inserted from below in the bottom section of the coupling section 41_a_, and a column 44 of a display apparatus is inserted from above in the apertures 40_e_ and 41_e_ of the printer mounting base 4 and coupled to the column support member 43. As a result, the display apparatus is fixed to the printer mounting base. It is noted that a customer display (not shown) for displaying the sum of prices of purchased products to the customers is preinstalled in an upper section of the column 44.

The peripheral wall of the column 44 engages the column support member 43 and the apertures 40_e_ and 41_e_ of the printer mounting base 4. As a result, the column 44 does not tilt with respect to the printer mounting base 4, and is mounted on the printer mounting base 4 with a sufficient mounting strength.

Moreover, the mounting base section 40 and the cantilever section 41 are more strongly connected to each other by the inserted column.

The receipt printer 3 is mounted on the cantilever of the printer mounting base 4. Therefore, an excessive load is not applied to the cantilever of the slip printer 2. In other words, the load of each of the printer section of each of the printers is received by each of the cantilevers. Accordingly, the deterioration of accuracy in the platen gap (i.e., the distance between the printer section of the slip printer and the platen) is substantially prevented.

FIGS. 12_a_, 12_b_ and 12_c_ show cross-sectional views of printers in accordance with embodiments of the present invention. More specifically, FIG. 12_a_ shows a cross-sectional view of a hybrid printer that combines the slip printer 2 and the receipt printer 3, FIG. 12_b_ shows a cross-sectional view of a printer embodiment using the slip printer 2 shown in FIG. 12_a_ as a single printer, and FIG. 12_c_ shows a cross-sectional view of a printer embodiment using the receipt printer 3 shown in FIG. 12_a_ as a single printer.

The hybrid printer shown in FIG. 12_a_ has a built-in control board 100. In the illustrated embodiment, an input/output circuit 101, a processing circuit 102, a drive circuit 104 for the slip printer, and a drive circuit 103 for the receipt printer are formed on the control board 100.

The input/output circuit 101 is connected through a serial or a parallel signal line 105 to a host, i.e., a host computer, and receives data and commands transmitted from the host, or transmits status data of the printer to the host.

The processing circuit 102 controls the drive circuits 103 and 104 in response to commands or data transmitted from the host. In other words, the processing circuit 102 interprets a command transmitted from the host. When the command represents data for the slip printer, the processing circuit 102 sends the data to a buffer within the drive circuit 104 of the slip printer 2. When the command represents data for the receipt printer, the processing circuit 102 sends the data to a buffer within the drive circuit 103 of the receipt printer 3. Also, the processing circuit 102 transmits printer status data to the host through the input/output circuit 101 in response to the status of a sensor (not shown) for each of the printers that detects the presence or the absence of a recording paper.

The drive circuit 104 for the slip printer is controlled by the processing circuit 102, and includes a buffer for storing print data for printing on slip papers, a driver for driving the printing head 22_a_, a driver for driving the motor 28 that is used for scanning the printing head in the direction perpendicular to the paper feed direction or driving the slip paper and the like.

The drive circuit 103 for the receipt printer is controlled by the processing circuit 102, and includes a buffer for storing print data for printing on a rolled receipt paper R, a driver for driving the thermal head 34, a driver for driving the motor 37 that is used for driving the platen roller 35 to transfer the rolled paper R, a driver for driving the auto-cutter 36 that is used for cutting printed receipt paper and the like. Outputs from the drive circuit 103 are transferred to the motor 37, the thermal head 35 and the auto-cutter 37 through the relay board 25 that is provided within the slip printer 2.

In this manner, the drive circuit 103 that drives the receipt printer 3 is provided together with the other circuits on a single control board, i.e., the control circuit 100 within the slip printer 2.

Figure 12B:
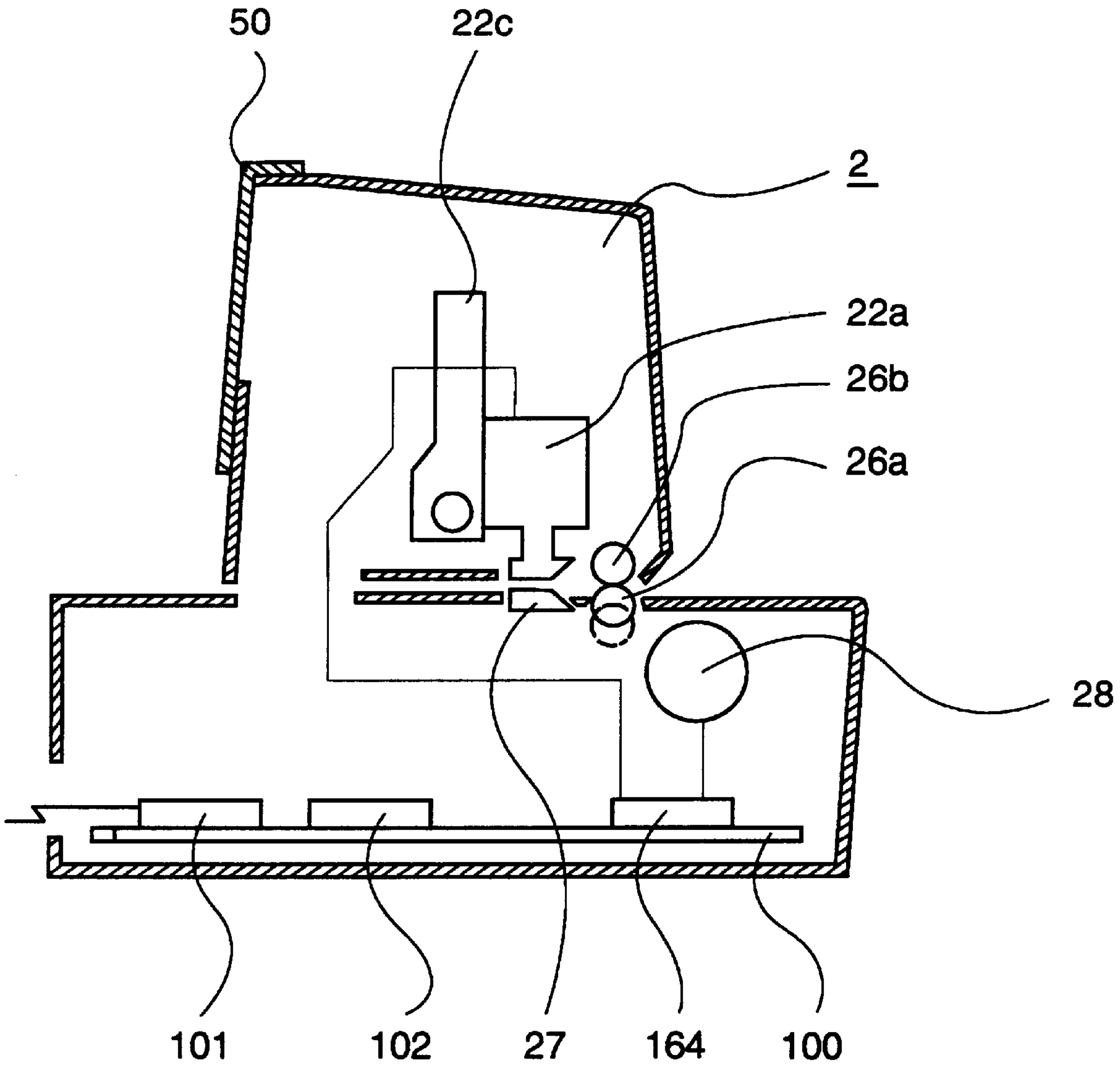
FIG. 12*b* shows a cross-sectional view of the slip printer shown in FIG. 2.

A slip printer, that can be mounted in a hybrid printer, can be used to manufacture an independent slip printer. To make such a slip printer, the opening 21*c* in the rear side of the slip printer 2 is simply covered by a cover 50, as shown in FIG. 12*b*.

A control board having the drive circuit 103 that drives the receipt printer 3 may be used for the slip printer of the type described above without any functional problems. However, in order to lower the manufacturing cost, the control board 100 preferably does not have the drive circuit 103 mounted thereon. It is also noted that the relay board 25 is not particularly required when the independent slip printer of the type described above is manufactured.

Figure 12C:
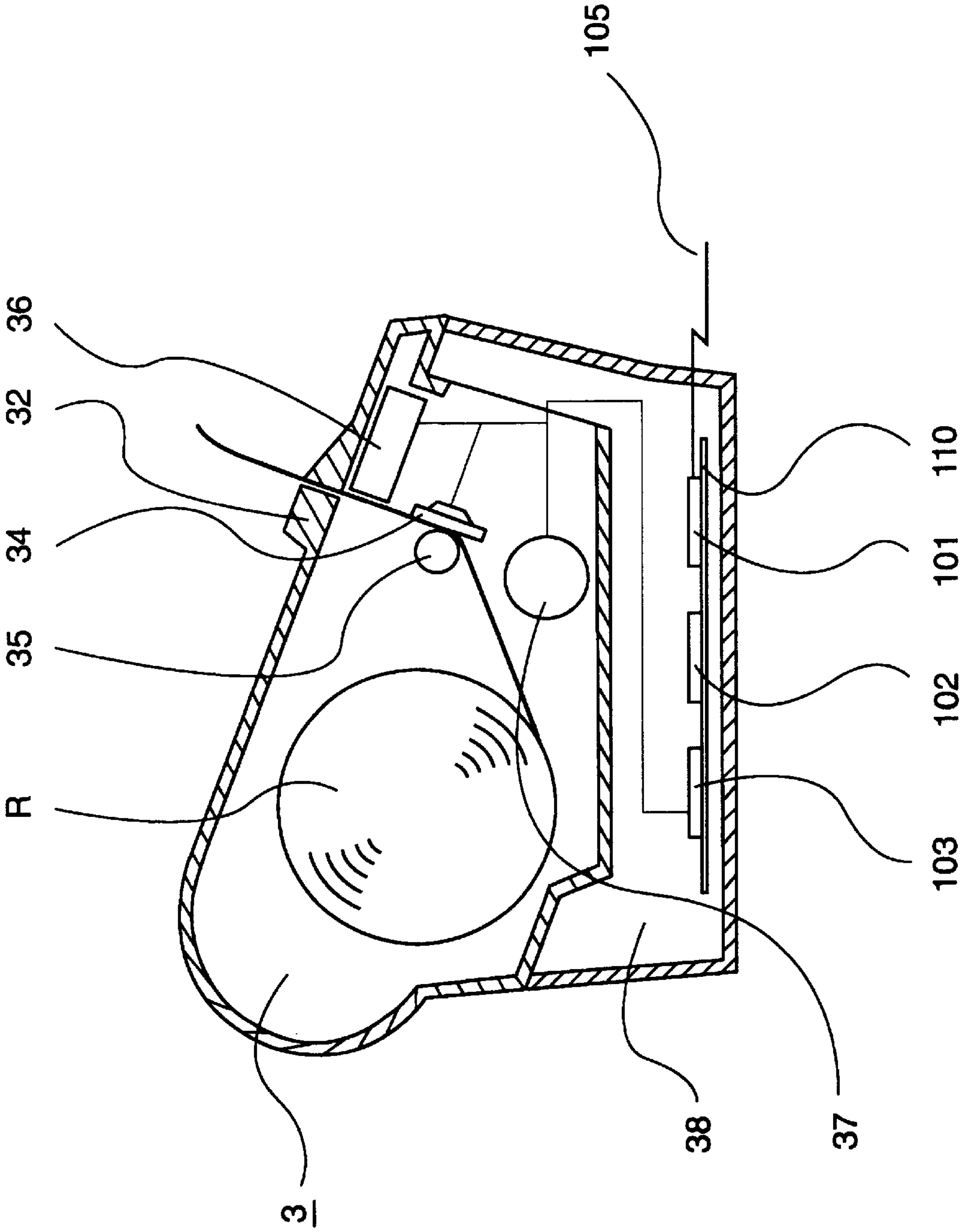
FIG. 12*c* shows a cross-sectional view of the receipt printer shown in FIG. 5.

A receipt printer, that can be mounted in a hybrid printer, can be used to manufacture an independent receipt printer. To make such a receipt printer, a control board 110 that is exclusively used for the receipt printer is mounted in the lower case 38, as shown in FIG. 12*c*. The receipt printer section 3 is mounted on the lower case 38. The control board 110, the thermal head 34, the auto-cutter 36 and the motor 37 are electrically, functionally connected.

The input/output circuit 101, the processing circuit 102 and the drive circuits 103 and 104, that are used in the control board 100, are formed into a unit. Also, the control board 110 uses the input/output circuit 101, the processing circuit 102 and the drive circuit 103.

In this manner, the circuits and the housings use as many common parts as possible and designed as units so that the units can be combined according to the requirement. As a result, the per unit manufacturing cost of a printer can be reduced. Further, each of the printers can be assembled, adjusted and examined on an independent assembly line. Then, the independently manufactured printers are mounted on a printer mounting base to assemble a hybrid printer. Such a manufacturing process improves the work efficiency. Moreover, even when one of the printers is broken, the broken printer can be readily removed from the rest of the printers. This facilitates the maintenance work.

It is noted that the present invention is not limited to the above-described embodiments, and various modifications can be implemented. For example, in the above-described embodiments, a dot impact type printer is used as the slip printer. However, the present invention is not limited to this particular type, and a variety of printers of different types can be used.

Moreover, any one of printers of different types can be used as a printer that is mounted on a cantilever section. For example, in addition to the thermal transfer type printer described above, an ink jet type printer can also be mounted on the cantilever section. Also, in accordance with the present invention, a substantial portion of the weight of the mounted printer is supported by the mounting base and does not substantially affect the cantilever section. Accordingly, the present invention is particularly effective for a dot impact type printer or an ink jet type printer in which the gap between a printer device and a recording paper influences the print quality.

Furthermore, a hybrid printer of the present invention and a personal computer can be integrally formed into a unit. Such a structure contributes to broadening the range of utility and reducing the required installation space.

As described above, a fist printing section is mounted on a first cantilever, and a second printer is mounted on a second cantilever fixed to a printer mounting base, which is different from the first cantilever. As a result, an excessive load is not applied to the first cantilever. In other words, the weight of the first printing section is received by the first cantilever and the weight of the second printer is received by the second cantilever. This structure therefore substantially prevents deterioration of the accuracy of the platen gap (i.e., the distance between the first printing section and a platen provided in a first transfer path).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A hybrid printer comprising:

a first printer defining a rear section and having a first printing section for printing on a first recording paper, a first transfer path for transferring the first recording paper to the first printing section, a first base having the first transfer path formed thereon and a first cantilever section for supporting the first printing section above the first base;

a second printer having a second printing section for printing on a second recording paper; and a printer mounting base having a second base, a second transfer path formed on the second base, and a second cantilever section fixed to the second base, wherein the second printer is mountable on the second cantilever of the printer mounting base, the printer mounting base is mountable in the rear section of the first printer, and the second transfer path is disposed outside the first transfer path and continues to the first transfer path on an extension line of the first transfer path when the printer mounting base is mounted on the first printer;

wherein the first printer and the second printer are detachably connected to each other to form the hybrid printer and are structurally and functionally independent from one another so that the first printer can print exclusively when detached from the hybrid printer and the second printer can print exclusively when detached from the hybrid printer;

wherein the first cantilever section has a lower face and the first base has a top surface that opposes the lower face of the first cantilever section wherein the first transfer path is defined between the lower face of the first cantilever section and the top surface of the first base, and has a closed side defining a paper guide wall and three open sides;

wherein the second cantilever section has a lower face and the second base has a top surface that opposes the lower face of the second cantilever section wherein the second transfer path is defined between the lower face of the second cantilever section and the top surface of the second base, and has a closed side defining a paper guide wall and three open sides; and wherein the first transfer path and the second transfer path in combination define three open sides when the printer mounting base is mounted on the first printer, the first transfer path and the second transfer path combining to form a single, elongated paper path which is unblocked.

2. A hybrid printer as defined in claim 1, wherein the first printer has a first housing for covering the first printing section, the first housing having a section defining a first aperture, a first controller device for controlling the first printing section, and a second controller device for controlling the second printer, and the second printer has a second housing for covering the second printing section, the second housing having a section defining a second aperture, and a driving device for driving the second printer, wherein the first and second apertures are disposed opposite to each other when the first printer and the second printer are mounted on the printer mounting base, and the second controller device for controlling the second printer and the driving device are connected to each other through the first and second apertures.

3. A hybrid printer as defined in claim 2, wherein a circuit for the first controller device for controlling the first printing section and a circuit for the second controller device for controlling the second printer are formed on a common control board.

4. A hybrid printer as defined in claim 1, further comprising:

a first fixing end section for supporting the first cantilever section and having a first guide section for guiding a side edge of the first recording paper, and a second fixing end section for supporting second cantilever section and having a second guide section for guiding a side edge of the first recording paper, wherein the second guide section continues to the first guide section on an extension line of the first guide section when the first printer is attached to the printer mounting base.

5. A hybrid printer as defined in claim 1, wherein the first printer is a serial impact printer, and the second printer is a thermal printer.

6. A hybrid printer as defined in claim 1, wherein the first transfer path is defined between the first cantilever section and the first base and the second transfer path is defined between the second cantilever section and the second base.

7. A hybrid printer as defined in claim 1, wherein the first cantilever section has a lower face and the first base has a top surface that opposes the lower face of the first cantilever section wherein the first transfer path is defined between the lower face of the first cantilever section and the top surface of the first base, and has a closed side defining a paper guide wall and three open sides, and wherein the second cantilever section has a lower face and the second base has a top surface that opposes the lower face of the second cantilever section wherein the second transfer path is defined between the lower face of the second cantilever section and the top surface of the second base, and has a closed side defining a paper guide wall and three open sides.

8. A hybrid printer as defined in claim 7, wherein the first transfer path and the second transfer path in combination define three open sides when the printer mounting base is mounted on the first printer.

9. A hybrid printer having a printer mounting base capable of mounting a first printer having a first printing section for printing on a first recording paper, a first transfer path for transferring the first recording paper to the first printing section, a first base having the first transfer path formed thereon, and a first cantilever for supporting the first printing section above the first base, and a second printer having a second printing section for printing on a second recording paper, the printer mounting base comprising:

a second base attachable to the first printer;

a second transfer path formed on the second base and positioned outside the first transfer path and continuous to the first transfer path when the first printer is attached to the second base;

a second cantilever fixed to the second base and capable of mounting the second printer thereon;

the first printer and the second printer being detachably connected to each other to form the hybrid printer and being structurally and functionally independent from one another so that the first printer can print exclusively when detached from the hybrid printer and the second printer can print exclusively when detached from the hybrid printer;

wherein the first cantilever has a lower face and the first base has a top surface that opposes the lower face of the first cantilever wherein the first transfer path is defined between the lower face of the first cantilever and the top surface of the first base, and has a closed side defining a paper guide wall and three open sides;

wherein the second cantilever has a lower face and the second base has a top surface that opposes the lower face of the second cantilever wherein the second transfer path is defined between the lower face of the second cantilever and the top surface of the second base, and has a closed side defining a paper guide wall and three open sides; and wherein the first transfer path and the second transfer path in combination define three open sides when the printer mounting base is mounted on the first printer, the first transfer path and the second transfer path combining to form a single, elongated paper path which is unblocked.

10. A printer mounting base as defined in claim 9, wherein the first transfer path defines an extension line, and the second transfer path is disposed on the extension line of the first transfer path when the first printer is attached to the second base.

11. A printer mounting base as defined in claim 9, wherein the first base has a first flat top surface defining at least a part of the first transfer path and the second base has a second flat top surface defining at least a part of the second transfer path wherein the first flat top surface levels with the second flat top surface when the first printer is attached to the second base.

12. A printer mounting base as defined in claim 9, wherein the second base has a protruded section formed adjacent to the second transfer path, the protruded section including a shoulder section located adjacent to the second transfer path, and the second cantilever has a retaining section for fixing the second cantilever to the second base, wherein the protruded section has a side section in an opposite side of the second transfer path with respect to the protruded section and an engaging section provided in the side section to engage the retaining section of the second cantilever, and the second cantilever is supported by the shoulder section of the protruded section located adjacent to the second transfer path, and is fixed to the second base by engagement of the retaining section of the second cantilever and the engaging section of the of the protruded section.

13. A printer mounting base as defined in claim 9, further comprising a section defining an aperture for mounting a display device support column.

14. A printer mounting base as defined in claim 12, wherein each of the second base and the second cantilever has a cylindrical sleeve defining an aperture therein, wherein the apertures communicate with each other and an exterior wall of one of the cylindrical sleeves is inserted in an interior wall of another of the cylindrical sleeves when the second cantilever is fixed to the second base.

15. A printer mounting base as defined in claim 12, wherein the second base has a first cylindrical sleeve defining an exterior wall and a first bore and the second cantilever has a second cylindrical sleeve defining an interior wall and a second bore, wherein the first bore and the second bore are aligned with each other and the exterior wall of the first cylindrical sleeve engages the interior wall of the second cylindrical sleeve when the second cantilever is fixed to the second base.

16. A printer that is mountable on the printer mounting base defined in claim 6, the first printer comprising:

a first printing section for printing on a first recording paper, a first transfer path for transferring the first recording paper to the first printing section, a first base having the first transfer path formed thereon, and a first cantilever for fixing the first printing section on the first base, wherein the second transfer path is disposed on an extension line of the first transfer path and continuous to the first transfer path upon mounting the printer on the printer mounting base.

17. A printer as defined in claim 16, wherein the first printer includes a first housing that covers the first printing section, a control board having a control circuit for controlling the first printing section mounted thereon and capable of mounting a control circuit for controlling the second printer, the first housing having a section defining an aperture for connecting a driving device for driving the second printer and the control board, and a second housing that is detachably mounted on the first housing and that covers the aperture when mounted on the second housing.

18. A printer that is mountable on the second cantilever of the printer mounting base defined in claim 9, the second printer comprising a second printing section for printing on a second recording paper.

19. A printer as defined in claim 18, further comprising:

a first housing that covers the second printing section;

a controller section that controls the second printer; and a second housing that covers the controller section, wherein the first housing is mountable on the printer mounting base, and is connectable to the controller section and to the second housing.

20. A printer mounting base as defined in claim 9, wherein the first transfer path is defined between the first cantilever and the first base and the second transfer path is defined between the second cantilever and the second base.

21. A printer mounting base as defined in claim 9, wherein the first cantilever has a lower face and the first base has a top surface that opposes the lower face of the first cantilever wherein the first transfer path is defined between the lower face of the first cantilever and the top surface of the first base, and has a closed side defining a paper guide wall and three open sides, and wherein the second cantilever has a lower face and the second base has a top surface that opposes the lower face of the second cantilever wherein the second transfer path is defined between the lower face of the second cantilever and the top surface of the second base, and has a closed side defining a paper guide wall and three open sides.

22. A printer mounting base as defined in claim 21, wherein the first transfer path and the second transfer path in combination define three open sides when the printer mounting base is mounted on the first printer.

* * * * *

UNITED STATES PATENT AND TRADEMARK OFFICE

CERTIFICATE OF CORRECTION

PATENT NO. : 6,421,133 B2
DATED : July 16, 2002
INVENTOR(S) : Kasai et al.

It is certified that error appears in the above-identified patent and that said Letters Patent is hereby corrected as shown below:

Column 7,
Line 9, change "provide" to -- provided --.

Column 10,
Line 8, change "fist" to -- first --.

Signed and Sealed this

Fourth Day of January, 2003

JAMES E. ROGAN
*Director of the United States Patent and Trademark Office*